United States Patent [19]

Mallouk et al.

[11] Patent Number: 4,954,388

[45] Date of Patent: Sep. 4, 1990

[54] FABRIC REINFORCED COMPOSITE MEMBRANE

[76] Inventors: Robert S. Mallouk, Box 332, R.D. #1, Chadds Ford, Pa. 19317; Phillip A. Branca, 132 Country Flower Rd., Newark, Del. 19711; Randal L. Perry, 1006 Timberwyck Rd., Wilmington, Del. 19810

[21] Appl. No.: 278,224

[22] Filed: Nov. 30, 1988

[51] Int. Cl.$^5$ .............................................. B32B 27/14
[52] U.S. Cl. .................................... 428/198; 204/295; 422/246; 422/252; 422/284; 422/315.5; 422/315.4; 422/332; 422/421; 422/422
[58] Field of Search ............... 428/198, 252, 332, 284, 428/421, 422, 246, 315.5, 315.7, 315.9; 204/295

[56] References Cited

U.S. PATENT DOCUMENTS 4,194,041 3/1980 Gore et al. .................. 428/315.5
4,604,170 8/1986 Miyake et al. .................. 204/296

Primary Examiner—James J. Bell
Attorney, Agent, or Firm—Mortenson & Uebler

[57] ABSTRACT

An abrasion-resistant, tear-resistant, multilayer composite membrane, useful in electrolysis, is provided comprising a continuous perfluoro ion exchange polymer film attached to a reinforcing fabric by means of a porous, expanded polytetrafluoroethylene (EPTFE) interlayer. The fabric and EPTFE are rendered hydrophilic and non-gas-locking by coating the interior and exterior surfaces thereof with a perfluoro ion exchange resin of equivalent weight less than 1000. The composite preferably is treated with an ionic perfluoro surfactant. Also provided is a multilayer composite according to the above in which the continuous perfluoro ion exchange film is itself a multilayer construction of a perfluorosulfonate polymer and a thin layer of perfluorocarboxylate polymer in which the perfluorosulfonate polymer interfaces with the EPTFE and the interior and exterior surfaces of the EPTFE and fabric are coated with perfluorosulfonate polymer. Also provided are a method of making the composites and methods of use for these fabric reinforced thin membrane structures as separators in electrolytic cells, and as selective barriers in permeation separation and facilitated transport operations.

27 Claims, 3 Drawing Sheets

FABRIC REINFORCED COMPOSITE MEMBRANE

BACKGROUND OF THE INVENTION

1. Field of the Invention

The invention relates to a composite membrane useful in electrolytic processes and other chemical separations.

2. Description of Related Art

In electrolytic processes such as the electrolysis of brine or hydrogen chloride, or in the electrowinning of various metals, it is important to provide a separator between anode and cathode compartments. Chemically stable ion exchange membranes made from perfluorosulfonic acid polymer, as described in U.S. Pat. Nos. 3,282,875; 3,718,627; 4,358,545; and 4,329,434, or from perfluorocarboxylic acid polymer, as described in U.S. Pat. Nos. 4,131,740 and 4,734,170, have found broad use as separators. For the electrolysis of brine to produce concentrated caustic, a multilayer membrane involving both perfluorosulfonic acid polymer and perfluorocarboxylic acid polymer has been used as described in Japanese Patent Application Disclosure No. 52/36589.

For reasons of quality, efficiency, cost effectiveness and often safety it is important that the separator be tear-, abrasion-, puncture- and scratch-resistant, yet not so thick or reinforced that its resistance to ionic conduction and concomitant power consumption are excessively high.

Unreinforced perfluoro ion exchange resin membranes are mechanically weak, especially when swollen in aqueous media. For example, characteristic Elmendorf tear strength for a 5 mil, 1100 equivalent weight film is about 80 grams when dry and considerably less when saturated with water. As a consequence, reinforcement mechanisms have been devised in which a fabric, usually made from polytetrafluoroethylene (PTFE) fibers, has been partially or wholly encapsulated by the perfluoro ion exchange polymer. Commercial products reflect this approach. However, it requires about a 5-10 mil thickness of ion exchange membrane to effectively bond to and encapsulate the fabric. Thinner membranes are unsatisfactory since they may not completely cover the fabric on both sides and the integrity of the membrane is impaired. The electrical resistance in aqueous media of this reinforced 5-10 mil structure is considerably higher than that of an unreinforced thinner membrane because of the increased thickness and the reduced effective cross-section available for ion transport because of the encapsulated fabric.

U.S. Pat. No. 4,604,170, in an attempt to address this problem, discloses a composite of a relatively thin continuous perfluoroionomer membrane with a porous, expanded polytetrafluoroethylene (EPTFE) structure rendered hydrophilic by a number of means to provide an electrolytic membrane with low resistance to ionic conduction and moderate tear strength. High levels of tear strength and cut-through and abrasion resistance are not provided by this approach, however. High levels of tear strength and abrasion resistance are not provided by any known prior EPTFE structure which is sufficiently porous to provide acceptably low voltage operation.

U.S. Pat. No. 4,604,170 also claims the use of a multilayer membrane consisting of perfluorosulfonic acid polymer and perfluorocarboxylic acid polymer which is laminated to porous EPTFE for use in brine electrolysis to reduce hydroxyl ion back migration.

Japanese Patent Application Disclosure No. 62-280231 describes a reinforced membrane structure involving a continuous perfluoro ion exchange film laminated to a porous body. The porous body is described as a three-layer laminate involving a fabric or scrim made from a fluorine containing polymer which has been sandwiched and encapsulated between two EPTFE sheets. To provide hydrophilicity and some measure of cohesion, the EPTFE sheets and the fabric are impregnated with a solution of the acidic form of perfluorosulfonic acid polymer. After drying, the porous body sandwich structure is heat laminated with the continuous perfluoro ion exchange sheet. This construction provides an EPTFE interlayer between the fabric and the continuous ion exchange membrane. However, the bond provided by the perfluoroionomer is low, e.g., less than 60 gms/in. peel strength for a 20 strand per inch scrim, and degrades to essentially no strength, e.g., less than 20 gms/in. peel strength, after immersion in hot water for 24 hours.

Japanese Patent Application Disclosure No. 62-280230 describes a composite structure in which a scrim or open fabric is heat laminated and encapsulated between a continuous perfluoro ion exchange membrane and an EPTFE sheet, thus imparting tear strength to the structure. This method of mechanical enhancement is deficient in that relatively thick ion exchange membranes or high equivalent weight membranes must be used to penetrate through the fabric and bond to the EPTFE sheet in order to avoid pinholes and thereby loss of electrolytic integrity. Thicker membranes or high equivalent weight membranes result in higher voltage operation. Also this method is not applicable to composites having more tightly woven fabrics, which in some applications may be desirable to protect the membrane from cutting or abrasive damage.

The present invention overcomes most of the mechanical deficiencies of previous membranes and, surprisingly, provides a membrane having a lower resistance to ionic conduction which approaches that of very thin, unreinforced perfluoro ion exchange polymer membranes.

In the separation of fluids, membranes through which fluids have different permeation rates have been useful in separating mixtures of those fluids. Such films have been wound with macroporous separating meshes which permit free flow of fluids to and from the membrane's surfaces and modules have been constructed. Thin perfluoroionomer films have a very high permeability to water and some other polar molecules, but effective permeation separation modules can not be built from these thin, fragile perfluoroionomer films.

Facilitated transport is a related separation technique wherein a continuous membrane is plasticized or swollen with a liquid. The dissolved liquid complexes with one of the fluids to be separated and selectively facilitates its transport across the membrane. Again, thin perfluoroionomer films offer some unique opportunities for facilitated transport, as, for example, in the separation of amino acids in aqueous media, but the thin perfluoroionomer is not sufficiently strong to undergo module construction or withstand operating pressure differentials. U.S. Pat. No. 4,194,041 provides for a waterproof article which permits the passage of water vapor and includes a hydrophilic layer. Specific claims are drawn to a perfluoroionomer, which permits the passage of water vapor and which is composited with a hydrophobic EPTFE layer which prevents the passage of liquid water. However, the ability to transport aqueous liquids is important not only in electrolytic processes but also in permeation separation and facilitated transport operations.

The composites of the present invention overcome the mechanical strength limitations of thin perfluoroionomer films without significantly reducing the high permeation and transport rates possible with these thin perfluoroionomer films. In addition, the composites of this invention provide for an EPTFE layer which is rendered hydrophilic by coating the interior and exterior surfaces of the EPTFE with a perfluoroionomer without destroying its porosity. In this way, gas locking of the EPTFE structure, which blocks the flow of aqueous liquids to or from the continuous membrane's surface, is avoided.

The structure of the present invention involves the flow and/or mechanical interlocking of the fiber of the fabric into the pores of the EPTFE sheet, resulting in strong bonds, e.g., varying from 80 to 500 gms/in. peel strength, in the absence of an adhesive, which remain essentially unchanged even after long exposure in boiling water. Indeed, in some cases where extensive penetration of the surface layer of the polymer into the sheet is achieved, the EPTFE sheet fails cohesively before the fabric/EPTFE interface can be separated.

SUMMARY OF THE INVENTION

A multilayer composite membrane is provided comprising a synthetic fabric bonded to one surface of a layer of porous, expanded polytetrafluoroethylene (EPTFE), the EPTFE layer having a continuous perfluoro ion exchange polymer film laminated thereto on the surface opposite the one surface, the fabric and porous EPTFE having a coating on at least a portion of the internal and external surfaces thereof of a perfluoro ion exchange resin. The bond between the synthetic fabric and EPTFE is believed to be a mechanical bond formed at points of contact between the fabric and the EPTFE layer.

Also provided is a multilayer composite membrane comprising a continuous perfluoro ion exchange polymer film having a synthetic fabric layer bonded to both surfaces of the perfluoro ion exchange polymer film in sandwich-like configuration by means of an EPTFE interlayer interposed between the ion exchange polymer film and each synthetic fabric layer, the fabric and porous EPTFE having a coating on at least a portion of the internal and external surfaces thereof of a perfluoro ion exchange resin, the bond between the synthetic fabric and EPTFE being at least partially a mechanical bond formed at points of contact between the fabric and the EPTFE layers. The fabric preferably is made from halogen containing synthetic polymer fibers such as polytetrafluoroethylene, a perfluoro copolymer of tetrafluoroethylene or polytetrafluoroethylene fibers coated with perfluoro copolymers of tetrafluoroethylene. The fabric may be woven or nonwoven. The continuous perfluoro ion exchange polymer film preferably is perfluorosulfonate or perfluorocarboxylate. The interior and exterior surfaces of the EPTFE and fabric preferably are coated with perfluorosulfonic acid polymer of equivalent weight less than 1000 or perfluorocarboxylic acid polymer of equivalent weight less than 1000. The fabric and EPTFE preferably are impregnated with an ionic perfluorosurfactant.

The composite may be used as a reinforced thin selective barrier in chemical separations, providing mechanical strength without sacrificing low resistance to selective transport inherent in a thin continuous perfluoro ion exchange polymer film alone. The composite may be employed as an electrolytic separator between anode and cathode compartments in an electrolyzer, providing low voltage operation, and as a thin continuous barrier in permeation separations and in facilitated transport operations, whereby said fabric provides mechanical support and the spaces between fibers provide avenues of passage of fluids to and from the continuous membrane's surfaces without substantially sacrificing the high selective permeation rates to water and other hydrophilic materials inherent in the thin continuous perfluoro ion exchange polymer film.

Also provided is a process for making the multilayer composite of the invention.

Figure 1:
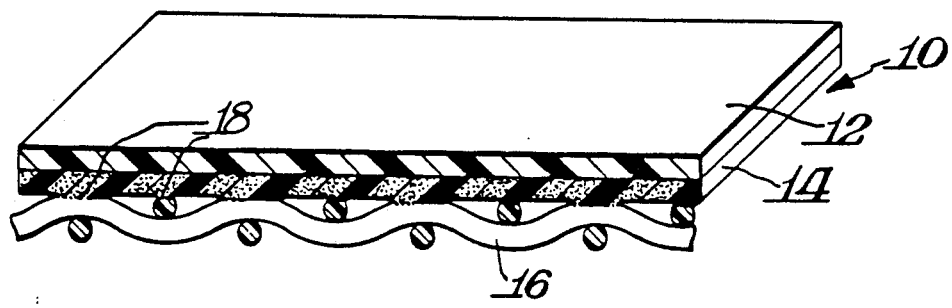
FIG. 1 is a perspective cross-sectional view of one embodiment of the composite of the invention.

DETAILED DESCRIPTION OF THE INVENTION AND PREFERRED EMBODIMENTS WITH REFERENCE TO THE DRAWINGS

A mechanically strong multilayer composite membrane with low resistance to ionic conduction in electrolytic processes and allowing high permeation rates in permeation separation and facilitated transport operations is provided, comprising a continuous perfluoro ion exchange polymer film attached on one or both sides to a reinforcing fabric by means of an EPTFE interlayer, wherein the fabric(s) and EPTFE interlayer(s) are rendered hydrophilic and non-gas-locking by coating at least a part or all of the interior and exterior surfaces thereof with a perfluoro ion exchange resin, preferably of equivalent weight less than 1000. Initial wetting is assured by treatment of the fabric(s) and EPTFE interlayer(s) with a water soluble ionic surfactant such as ammonium perfluorooctanoate. The continuous perfluoro ion exchange membrane may be perfluorosulfonic acid polymer or perfluorocarboxylic acid polymer and the perfluorosulfonic acid polymer is preferred.

In electrolysis processes producing caustic exceeding 20% in concentration, a continuous bilayer ion exchange membrane comprising a thin layer of perfluorocarboxylate polymer on one surface of perfluorosulfonate ion exchange polymer film (as described in U.S. Pat. No. 4,487,668, England et al (DuPont)) is incorporated in the composite of this invention with the thin sulfonate layer interfacing with the EPTFE and with the carboxylate layer providing a barrier to back migration of the hydroxyl ions.

For processes producing lower strength caustic from brine, a thin 1500 equivalent weight perfluorosulfonate layer may be incorporated in the composite of this invention to provide a barrier to hydroxyl ion back migration. For electrolysis of sodium or potassium choride, the cation exchange layer may be coated with a non-electrode layer to reduce cell voltage. The nature and application of such layers are described in U.K. Patent 2064686.

The EPTFE layer of the present invention serves as an interlayer between a nonporous ion exchange membrane and a reinforcing fabric which: (a) provides mechanical anchoring sites whereby both the perfluoroionomer membrane and the fabric are firmly bonded to the EPTFE by interlocking of surface polymer from both the fabric and the perfluoroionomer membrane into the pores of the EPTFE; (b) provides a support preventing the relatively thin (e.g., 0.5-3 mil) ion exchange membrane from being ruptured between the fibers of the fabric in a lamination process and thereby preserving the integrity of the membrane; and, (c) by virtue of the thinness and high porosity of the EPTFE does not greatly reduce the effective cross-section of the membrane for ionic conduction. In this way, sturdy fabrics can be used to mechanically reinforce or armor thin perfluoroionomer membranes without greatly increasing the low resistance to ionic flow inherent in the unreinforced ion exchange membranes.

Correspondingly, the composites of the present invention can also be used in permeation separation and facilitated transport separation processes and devices. The fabric provides mechanical strength and support and the spaces between the fibers provide avenues for relatively unencumbered passage of fluids to and from the continuous membrane surface without substantially sacrificing the high selective permeation or facilitated transport rates possible with thin perfluoroionomer membranes. Coating the interior and exterior surfaces of the EPTFE with perfluoroionomer renders the EPTFE structure sufficiently hydrophilic to avoid gas locking which would block the free passage of aqueous liquids to the membrane surface. In addition, the external and internal coating provides an inert reinforcement of the EPTFE structure against compression and collapse under a substantial pressure gradient.

The invention also provides for the combination of perfluoroionomer membranes with any polymeric fabric or ceramic fiber fabric coated with polymer that can withstand the chemical and thermal constraints of electrolytic or other separation systems. Accordingly, halogen containing polymers and polymeric fibers are preferred. These include polytetrafluoroethylene and tetrafluoroethylene copolymers, PVC and chlorinated PVC.

As used in this application, the term "synthetic fiber" means all synthetic fibers which have a polymeric surface layer, to include, but not be limited to, EPTFE fiber, Teflon ® PFA fluorocarbon resin monofilament, Teflon ® FEP fluorocarbon resin monofilament, polyvinylchloride (PVC) monofilament, chlorinated PVC monofilament, other polymeric fibers, polymeric fibers with a surface coat of another polymer, glass fiber coated with a polymer, and other ceramic fibers coated with a polymer.

The term "fabric" in this disclosure refers to fabrics woven from these fibers and also non-woven webs and sheets of these fibers laid down by a variety of techniques. Within the intent of this disclosure, the term "fabric" also includes polymeric netting, meshes and screens fabricated as one web or by cutting holes in a sheet, in which the intersections between fibers or strength members are completely fused.

The term "bond" between fabric and EPTFE sheet in this disclosure refers to a union between the fiber or strength member of the fabric with the EPTFE sheet, the union being largely, but not necessarily exclusively, mechanical and involving the intermingling of surface components of the fiber with the fibrils and nodal structure of the EPTFE sheet. (See, e.g., U.S. Pat. No. 3,953,566 for a discussion of nodes and fibrils in porous EPTFE.) Thus the term "bond" in this disclosure embraces both the union effected by the entanglement of the nodes and fibrils of the EPTFE sheet with those of the fiber and the union effected by the flow of the surface layer of a polymeric fiber or a polymer coated fiber into the fibrils and nodal structure of the EPTFE sheet. The introduction of an adhesive material to effect the bond beyond those present in the fiber or in the EPTFE sheet is not contemplated.

A detailed description of the composite membranes of the invention and preferred embodiment is best provided with reference to the accompanying drawings wherein FIG. 1 is a perspective cross-sectional view of one embodiment of the composite of the invention. The multilayer composite 10 comprises synthetic fabric 16 bonded to one surface of a sheet of porous EPTFE 14. The EPTFE layer 14 has a continuous perfluoro ion exchange polymer film 12 laminated to its other surface as shown. Both the fabric 16 and the EPTFE layer 14 have a coating on at least a portion of their internal and external surfaces of a perfluoro ion exchange resin. The bond 18 between the synthetic fabric and the EPTFE is believed to be a mechanical bond at the points of contact between the fabric and the EPTFE.

Figure 2:
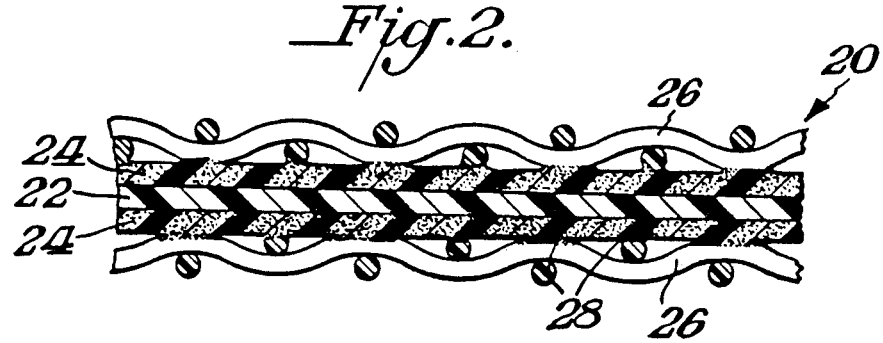
FIG. 2 is a cross-sectional view of a second embodiment of the composite of the invention.
Figure 3:
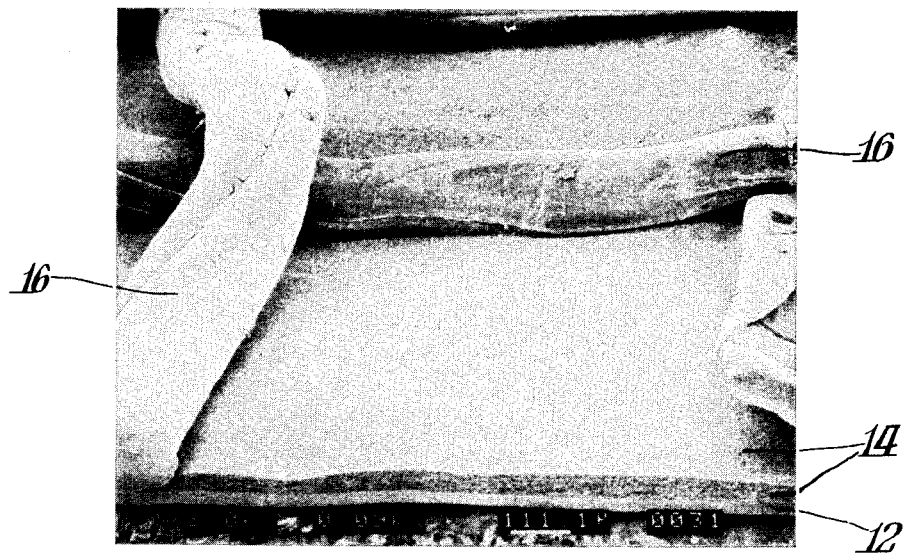
FIGS. 3 to 6 are photomicrographs taken at various magnifications showing the composite laminates according to the invention.
Figure 4:
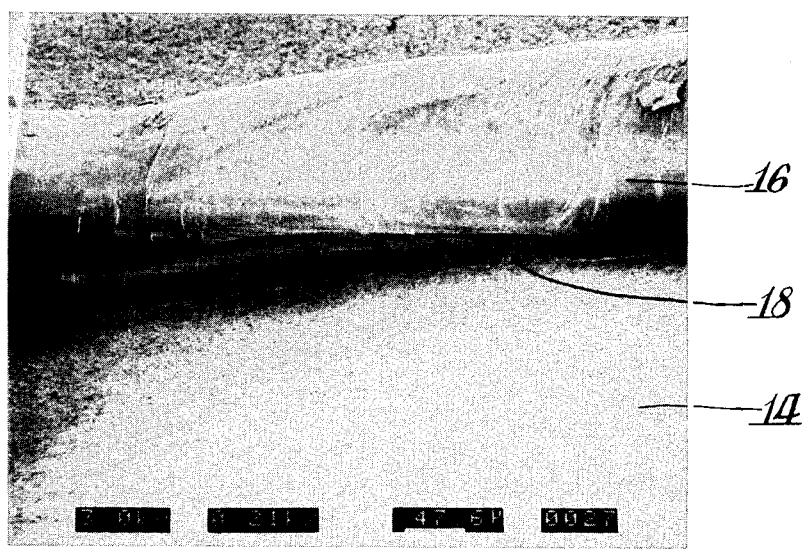
Figure 5:
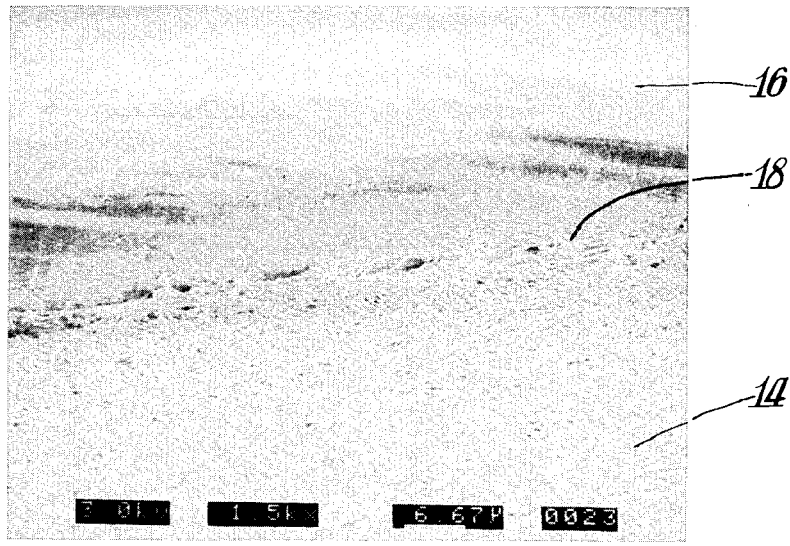
Figure 6:
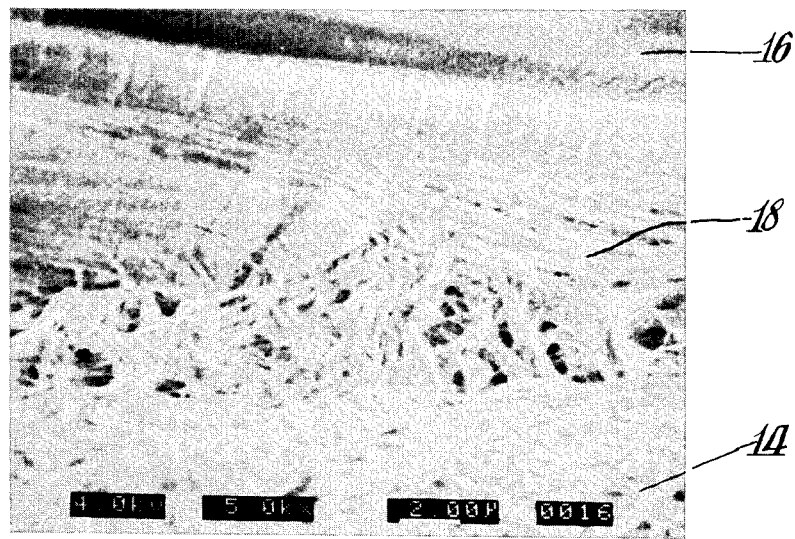

In another embodiment according to the invention, shown in FIG. 2, a multilayer composite membrane 20 is provided comprising a continuous perfluoro ion exchange polymer film 22 having fabric layers 26, 26 bond to both surfaces of film 22 in sandwich-like configuration by means of porous EPTFE interlayers 24, 24 interposed between film 22 and fabric layers 26, 26. The fabric and porous EPTFE have a coating on at least a portion of their internal and external surfaces of a perfluoro ion exchange resin. The bond 28 between the synthetic fabric 26 and the EPTFE 24 is believed to be a mechanical bond formed at the points of contact between the fabric and the EPTFE.

The fabric 16, 26 is preferably made from halogen containing synthetic polymer fibers such as polytetrafluoroethylene, a perfluoro copolymer of tetrafluoroethylene or polytetrafluoroethylene fibers coated with perfluoro copolymers of tetrafluoroethylene. The fabric may be woven or nonwoven fabric. The external surface of the fibers of the fabric is preferably non-ionomeric. The continuous perfluoro ion exchange polymer film 12, 22 may be perfluorosulfonate or perfluorocarboxylate. The perfluoro ion exchange polymer film may also be a bilayer comprising a layer of perfluorosulfonate bonded to a layer of perfluorocarboxylate, wherein the perfluorosulfonate is adjacent the EPTFE layer.

The interior and exterior surfaces of the EPTFE and fabric are coated with perfluorosulfonic acid polymer, preferably of equivalent weight less than 1000 or perfluorocarboxylic acid polymer, also of equivalent weight less than 1000. The fabric and EPTFE preferably are impregnated with an ionic perfluorosurfactant.

The EPTFE layer is about 0.2 to about 5 mils thick. The fabric and porous EPTFE may have a coating on all internal and external surfaces thereof of a perfluoro ion exchange resin. The peel strength of the bond between the fabric and EPTFE layer can exceed 30 grams per inch of width after immersion of the composite in water maintained at 90°-100° C. for over 22 hours.

The composite may be used as a reinforced, thin selective barrier in chemical separations, as an electrolytic separator between anode and cathode compartments in an electrolyzer, thereby providing low voltage operation, as a thin continuous barrier in permeation separation operations, or as a thin continuous barrier in facilitated transport operations, whereby the fabric provides mechanical support and the spaces between fibers provide avenues for passage for fluids to and from the continuous membrane's surfaces without substantially sacrificing the high transport rates inherent in thin facilitated transport systems involving thin perfluoro ion exchange polymer films.

FIGS. 3 to 6 are scanning electron micrographs, taken at magnifications of 90×, 210×, 1500× and 5000×, respectively of the multilayer composite membrane depicted schematically in FIG. 1.

In FIGS. 3 to 6, the synthetic fabric 16 is seen bonded to one surface of a sheet of porous EPTFE 14. The EPTFE layer 14 has the continuous perfluoro ion exchange polymer film 12 laminated to its other surface. Both the fabric 16 and the EPTFE layer have a coating on at least a portion of their internal and external surfaces of a perfluoro ion exchange resin. The bond 18 between the synthetic fabric strands and the EPTFE is indicated to be a mechanical interaction at the points of contact between fabric and EPTFE.

The preferred process for the manufacture of a three-layer, fabric-reinforced composite membrane involves a series of steps:

(1) Thermal lamination of fabric and EPTFE to form an intermediate laminated sheet;

(2) Melt extrusion of the precursor of the perfluorinated ionomer to form a film. This precursor polymer may be the sulfonyl fluoride copolymer or the carboxylester copolymer. Both materials may be coextruded to form a bilayer film containing a layer of each polymer;

(3) Lamination of the precursor film to the intermediate laminate;

(4) Impregnation of the intermediate laminate with a dilute (e.g., 2%) liquid composition of low equivalent weight ionomer (as disclosed in U.S. Pat. No. 4,453,991), and drying. (It is important to render the EPTFE layer hydrophilic at this stage to avoid blistering during the next hydrolysis step (5));

(5) Hydrolysis of the precursor film layer to the perfluoroionomer form in an alkaline water polar organic solvent mixture, rinsing with water, and drying; and, preferably, (6) Impregnation of the intermediate laminate with an ionic surfactant and drying.

Each step of the process can be performed on a separate piece of continuously operating equipment with a roll wind-up. However, to prepare a composite involving a very thin continuous ionomeric film layer, and also for economics at high production levels, steps (2) and (3) can be combined. The intermediate laminate prepared in step (1) can be melt coated with the precursor polymer to lay down a sub-mil thickness of the continuous film layer. Step (4) could be integrated with step (3) by spraying or otherwise impregnating the trilayer laminate as it comes off the laminator (or melt coater) and drying before wind-up.

The two-side armored five-layer composite as shown in FIG. 2 is prepared by following steps (1) and (2) to yield a three-layer laminate and then repeating step (2) in applying a second intermediate laminate (as prepared in step (1)) to the other side of the continuous film layer.

Alternatively, the continuous perfluorosulfonic acid polymer membrane can be applied to the EPTFE membrane by coating the EPTFE membrane with a liquid composition of 1100 EW perfluorosulfonic acid polymer in a solvent system that forms a thin, even layer of liquid on the EPTFE surface, but does not substantially penetrate into the EPTFE structure. This step replaces steps (2) and (3) above and eliminates the need for step (5).

According to the above process, rolls of fabric and EPTFE are to be fed to a continuous laminator provided with either a series of heated nip rolls or a heated large roll with a wide stainless steel band on it. The webs are fed around rolls and through the nips or between the band and the large roll to maintain contact at laminating temperature for a few seconds (e.g., 1–10 seconds).

The rolls or band on the fabric side are preferably to be maintained at least 20°–30° C. below the temperature at which the fibers in the fabric start to shrink, melt or deform, or suffer a significant permanent loss in physical properties during the few seconds of contact time. For fabrics made from EPTFE fiber, this temperature can be as high as 400° C. for a few seconds. For fabrics made from EPTFE fiber coated with Teflon ® FEP fluorocarbon resin, or for fabrics made from glass fiber coated with Teflon ® FEP fluorocarbon resin, it is preferable to maintain the temperature below 250° C.

The rolls or band on the EPTFE side are maintained at a temperature sufficiently high to achieve rapid bonding at the EPTFE/fiber interface, but not so high as to degrade the EPTFE or fabric during the time of contact. This can be 400° C. or higher depending on line speed and the particular EPTFE and fabric involved. Such high temperatures are required to rapidly bond the EPTFE fiber to the EPTFE sheet. However, for fabrics made from fibers with an FEP resin coating, the roll or band temperature on the EPTFE side preferably should be in the 300°–375° C. range, depending on line speed and the particular EPTFE and fabric involved. Similarly, EPTFE can be laminated to fabrics made from less thermally stable fibers (e.g., PVC monofilament), with corresponding adjustment of the band or roll temperatures on each side of the composite, depending on line speed and the thermal-mechanical properties of the fiber.

The precursor polymer is extruded at a temperature less than 300° C. to form a film of 0.5 to 5 mils in thickness. This film can be of sulfonyl fluoride polymer, carboxylester polymer, or a multilayered structure of sulfonyl fluoride polymers, carboxylester polymers or both, where the different polymers form distinct layers in the coextruded film. Alternatively, a multilayer film can be made by extruding separate films and "blocking" the films together, i.e., putting the films together under low pressure and heat so that they adhere together through the lamination process.

Lamination of the film (single or multilayer) to the side of the intermediate laminate opposite the fabric, with the sulfonyl fluoride side of a bifilm placed in contact with the EPTFE, takes place with surface temperatures (two surfaces) less than 280° C. and under a pressure differential of not more than 760 mm mercury, with the preferred method being to apply a vacuum of no greater than 500 mm mercury to the fabric side of the composite while keeping the film side at atmospheric pressure. The contact time to heat and vacuum is to be less than 90 seconds.

The composite should be coated with a liquid composition of ionomer prior to hydrolysis in a primarily aqueous media. Otherwise, the ionomer film will swell but the hydrophobic EPTFE will not allow the release of the hydrostatic pressure from the swelling, causing the structure to delaminate.

The aliphatic alcohol-water liquid composition of the acidic from of the 920 EW perfluorosulfonic acid polymer is heated under partial vacuum at less than 80° C. to remove most of the liquid component leaving a residue of at least 30% solids. This residue is diluted at atmospheric pressure in a polar organic solvent, preferably a lower aliphatic alcohol, such as ethanol, to 1–6% solids, by weight. This liquid composition is sprayed or coated onto the fabric side of the laminate in an amount sufficient to completely impregnate the EPTFE with the liquid composition. The EPTFE becomes translucent and nearly transparent upon complete impregnation. The laminate is dried at less than the boiling point of the solvent in the liquid composition.

The composite thus formed is hydrolyzed to ionomeric form as described in U.S. Pat. No. 4,584,071, e.g., 50°–100° C. solution of 6–20% KOH (preferred) or other soluble hydroxide, 5–40% polar organic solvent (DMSO, preferred) and 50–90% water with a contact time of at least 5 minutes. The composite is next rinsed with water for at least 10 minutes resulting in the potassium salt form of the perfluorosulfonate polymer. If desired, the polymer can be exchanged to the desired ionic form by contacting a bath of at least 1% of a salt of the desired cation, or an acid if the hydrogen form is desired, rinsed again with water and dried.

If desired, the dry laminate is impregnated by spraying, immersion or coating with a solution (0.2–5%) of an ionic surfactant in water or a salt/water solution, and dried.

Alternatively, hydrolysis can be carried out prior to coating EPTFE with ionomer if the water content of the hydrolysis bath is low enough so that the bath solution will fully penetrate the EPTFE, thus preventing delamination from occurring. This would involve hydrolyzing the structure immediately after lamination of the polymer film in a solution of 5–20% alkali metal hydroxide, 30–90% polar organic solvent and 0–60% water, the solution being such that it will enter into the EPTFE portion of the composite to completely fill the porous structure, at 50°–100° C. with a contact time of at least 5 minutes. The structure is rinsed in water and dried. The aforementioned 1–6% liquid composition of 920 EW acid form of the perfluorosulfonic acid polymer in a polar organic solvent is then sprayed or coated onto the EPTFE side of the structure in the same manner as above. The surfactant, if desired, and salt, if desired, can be applied with the polymer solution.

The examples which follow are intended to be illustrative of the composites according to the invention and the method of its preparation and use, but should not be construed as limiting the scope of the claims in any way.

EXAMPLE I

An expanded PTFE sheet structure, as disclosed in U.S. Pat. No. 3,953,566, which is incorporated herein by reference, here designated as EPTFE-1 and having the following physical characteristics was used: air flow was 7–10 seconds as measured by Gurley Densometer ASTM D726-58; thickness was between 0.0025 and 0.0045 inches; apparent density was between 0.27 and 0.33 gms/cc and pore size was about 0.45 microns as indicated by methanol bubble point (measured by ASTM F316-80) which was between 9.5 and 12.5 psi. Also used was an expanded PTFE sheet structure here designated as EPTFE-2 which had the following physical characteristics: air flow was 3.5–4.5 seconds as measured by Gurley Densometer; thickness was 0.0030–0.0036 inches; apparent density was between 0.20 and 0.25 gms/cc and pore size was about 1 micron as indicated by the methanol bubble point test, which was measured by ASTM F316-80, and was between 5.5 and 8.5 psi.

A 20-strand per inch by 20-strand per inch plain weave fabric of 400 denier EPTFE fiber, tenacity exceeding 1200 grams; here designated as G20×20, was used. Also used and here designated F8×8 was an 8-strand per inch by 8-strand per inch plain weave fabric of Teflon ® 100 FEP fluorocarbon resin coated 200 denier EPTFE fiber, tenacity exceeding 600 grams. W. L. Gore & Associates, Inc. prepared and provided the 200 denier EPTFE fiber with a 1.25 mil thick coating of Teflon ® FEP. Teflon ® 100 FEP fluorocarbon resin is a copolymer of polytetrafluoroethylene and hexafluoropropylene commercially available from E. I. duPont de Nemours & Co., Inc.

One turn of G20×20 was wrapped on a 3-inch diameter aluminum mandrel. This was covered by one turn of EPTFE-1 and the assembly clamped at the ends of the mandrel and along the seam to prevent unraveling. The assembly was then immersed in a 370° C. salt bath for one minute, removed to 25° C. ambient temperature for 5 minutes and then cooled rapidly by immersion in 25° C. water. Removal from the mandrel yielded an intermediate laminate in which a bond between the G20×20 fabric and the EPTFE was established. A one mil film of 1500 equivalent weight of the sulfonyl fluoride form of perfluorosulfonic acid polymer was then melt laminated to the EPTFE side of the intermediate laminate by vacuum lamination at 240° C.

The fabric/EPTFE side of the three-ply composite was sprayed with a liquid composition of 2%, 920 equivalent weight (EW) hydrolyzed perfluorosulfonic acid polymer (as disclosed in DuPont UK Patent 1,286,589) in a 5% water-ethyl alcohol mixture until the EPTFE became translucent, and then dried at 25° C. for 1 hour. The entire structure was then exposed to a 14% potassium hydroxide, 30% dimethyl sulfoxide solution in water at 80° C. for 1 hour to hydrolyze the continuous membrane to the potassium salt form. Finally, the fabric side was sprayed with a 2% solution of ammonium perfluorooctanoate in water and dried. This structure is here designated Composite A.

A three-ply Composite B was prepared using fabric G20×20 and EPTFE-2 to prepare the intermediate laminate. The rest of the steps were the same as for Composite A.

A five-ply Composite C, a membrane armored on both sides by fabric, was prepared by sequentially melt laminating a G20×20/EPTFE-1 intermediate laminate to first one side of the sulfonyl fluoride form of a one mil, 1500 equivalent weight perfluorosulfonic acid polymer and then to the other. Prior to hydrolysis, the five-ply composite was sprayed on both sides with a liquid composition of 2%, 920 equivalent weight perfluorosulfonic acid polymer. After hydrolysis, both sides were sprayed as before with 2% ammonium perfluorooctanoate solution in water.

Intermediate laminates of F8×8 fabric with EPTFE-1 were prepared by wrapping a 3-inch diameter mandrel with aluminum foil, then one wrap of F8×8 fabric, then one wrap of EPTFE-1, clamping, immersion in a 370° C. salt bath for 40 seconds and cooling. The aluminum foil facilitated removal of the intermediate laminate from the mandrel and then the foil could be stripped from the intermediate laminate. A three-ply laminate with one mil, 1500 equivalent weight perfluorosulfonate polymer film was then prepared by a procedure similar to that used for Composites A and B. This composite is here designated Composite D.

A three-ply Composite E was prepared using fabric F8×8 and EPTFE-1 by the same procedures for Composite D but only a 20 second lamination time in a 370° C. salt bath. Then a 3.2 mil coextruded bifilm consisting of 0.8 mils of the carboxylester form of the perfluorocarboxylate (CR) polymer adjacent to 2.4 mils of the sulfonyl fluoride form of the perfluorosulfonate (XR) polymer was melt laminated to the EPTFE side of the intermediate laminate by vacuum lamination at 230° C.; the perfluorosulfonate side of the bifilm was oriented towards and laminated to the EPTFE. The rest of the steps were the same as for Composite A.

A two-ply Composite F, repeating the approach described in U.S. Pat. No. 4,604,170, was prepared by melt laminating a one mil film of 1500 EW of the sulfonyl fluoride form of perfluorosulfonic acid polymer to EPTFE-1 on a vacuum laminator at 230° C. The EPTFE side of this composite was sprayed as before with a liquid composition of 2%, 920 EW hydrolyzed perfluorosulfonic acid polymer and the rest of the steps were the same as Composite A.

In the same manner, two-ply Composite G was prepared using EPTFE-2 and a one mil film of 1500 EW of perfluorosulfonic acid polymer.

Also evaluated were a one mil film of unsupported hydrolyzed perfluorosulfonic acid polymer, Nafion ® 324 perfluorinated membrane, and Nafion ® 90209 perfluorinated membrane. Nafion ® 324 (hereafter N324) is a commercially available six mil perfluorosulfonic acid polymer structure which consists of a one mil layer of 1500 EW (equivalent weight) perfluorosulfonate polymer as a hydroxyl ion barrier and a 5 mil supporting layer of 1100 EW perfluorosulfonate polymer in which a 24×24 strand per inch reinforcing fabric of PTFE is embedded. Nafion ® 90209 is a commercial membrane for finite gap operation in 32% caustic production. It is a bimembrane of a perfluorosulfonate polymer and a perfluorocarboxylate polymer in which a 15×15 strand per inch plain weave 200 denier GORE-TEX ® fiber is embedded. The membranes are available from the E. I. DuPont de Nemours & Co., Wilmington, DE and GORE-TEX ® fiber is an EPTFE fiber available from W. L. Gore & Associates, Inc., Newark, Del.

Tear strength of these composites were then evaluated on an Elmendorf Tear Tester (ASTM D-1424). For each structure, a tear measurement was made in each of the two fabric directions and then averaged. Results are shown in Table 1.

TABLE 1

| Designation | Description | Tear Strength, (grams) |
|---|---|---|
| 1-1500XR | 1 mil 1500 EW perfluorosulfonic acid polymer | 130 |
| 1-1100XR | 5 mil 1100 EW perfluorosulfonic acid polymer | 80 |
| N-324 | 6 mil 24 × 24 Teflon ® fiber fabric reinforced Nafion ® | 2620 |
| N90209 | 6.5 mil 15 × 15 GORE-TEX ® fiber fabric reinforced Nafion ® | 6080 |
| Composite A | G20 × 20/EPTFE-1/1-1500XR | 5120 |
| Composite B | G20 × 20/EPTFE-2/1-1500XR | 4030 |
| Composite C | G20 × 20/EPTFE-1/1-1500XR/EPTFE-1/G 20 × 20 | 5800 |
| Composite D | F8 × 8/EPTFE-1/1-1500XR | 3710 |
| Composite E | F8 × 8/EPTFE-1/2.4-1100XR/0.8CR | 2620 |
| Composite F | EPTFE-1/1-1500XR | 30 |
| Composite G | EPTFE-2/1-1500XR | 30 |

Thus, through an EPTFE interlayer one mil perfluorosulfonic acid polymer membrane can be fabric reinforced to enhance tear strength by over an order of magnitude. Tear strength of these composites are also an order of magnitude higher than the membrane/EPTFE composites of U.S. Pat. No. 4,604,170, represented here by Composites F and G, and of the same order of magnitude as thick commercial composites where fabric is embedded in the membrane.

EXAMPLE II

Relative scratch resistance of the composites in this invention compared to an unreinforced perfluorosulfonic acid polymer was demonstrated as follows: Composite A from Example I was placed with the fabric side up on a hard flat surface and was stroked with moderate pressure 100 times with the round end of a 1-⅝ inch×5/16 inch paper clip. It was stroked 25 times in each of the fabric directions and 25 times in each of the bias directions. No visible holes in the reverse continuous membrane side were noted nor was any air flow detected in the Gurley densometer. In contrast, a one mil film of 1500 equivalent weight perfluorosulfonic acid polymer was stroked once and a scratch and visible holes were produced. Gurley densometer measurement on this scratched sample was six seconds for 100 ml air flow.

Thus, the utility of the composite of this invention to armor a fragile, thin ion exchange membrane against scratching or abrasion is demonstrated. Composite C of Example I would provide protection on both sides of the membrane.

EXAMPLE III

Composite A and Composite D were prepared as described in Example I. These composites were immersed for one-half hour in a 2% solution of ammonium perfluorooctanoate in water that had been saturated with sodium chloride at room temperature. Nafion ® N324, a commercially available membrane, was soaked in a 2% sodium hydroxide solution in water overnight at room temperature.

Each membrane was placed in an electrochemical cell with an active area of 45 cm² (3" diameter). The anode compartments were made of glass and fitted with flattened DSA anodes obtained from Eltech Systems Corp. of Chardon, Ohio. The cathode compartments were made of polymethylmethacrylate and were fitted with a mild steel expanded metal cathode. In each cell the anode was placed in contact with the membrane and 3 mm gap was maintained between the membrane and the cathode. In each case, the 1500 EW layer was oriented towards the cathode.

The cells were operated under the following conditions: cell temperature was 85°-90° C.; total current was 14 amperes for a current density of 3.1 kiloamperes per square meter; the concentration of the sodium chloride feed solution was 23.5–24% by weight and it was fed at 3–3.5 ml per minute; the concentration of the sodium hydroxide produced was controlled to 15–18% by weight by constant water addition to the catholyte; one foot head on the cathode compartment was maintained.

Operating results after steady state was reached are tabulated in Table II along with Elmendorf tear strength values. Current efficiencies (C.E.) were obtained by relating the amount of sodium hydroxide produced to the number of coulombs used.

TABLE II

| Designation | % NaOH | % C.E. | Volts | KWH/MT* | Tear Strength (grams) |
|---|---|---|---|---|---|
| N324 | 16.5 | 85.0 | 3.72 | 2933 | 2620 |
| Composite A | 15.9 | 86.0 | 3.29 | 2564 | 5120 |
| Composite D | 15.6 | 87 | 3.56 | 2740 | 3270 |

*Kilo watt hours/metric ton of sodium hydroxide

Thus, the composites of this invention offer about 7–14% improvement in energy consumption over the commercial membrane for this use, and a 25–95% improvement in tear strength.

EXAMPLE IV

Composite B was prepared as described in Example I. This composite was soaked for one-half hour in 0.2% solution of ammonium perfluorooctanoate in water at room temperature. Nafion ® N324, the commercially available membrane, was soaked in 2% sodium hydroxide solution in water overnight at room temperature.

Each membrane was placed in an electrochemical cell with an active area of 45 cm² (3" diameter). The anode compartments were made of glass and fitted with flattened DSA anodes obtained from Eltech Systems Corp. of Chardon, Ohio. The cathode compartments were made of polymethylmethacrylate and were fitted with a mild steel expanded metal cathode. In each cell, the anode was placed in contact with the membrane and 3 mm gap was maintained between the membrane and the cathode. In each case, the 1500 EW layer was oriented towards the cathode.

The cells were operated under the following conditions: cell temperature was 85°-90° C.; total current was 14 amperes for a current density of 3.1 kiloamperes per square meter; the concentration of the potassium chloride feed solution was 23.5–24% by weight and it was fed at a rate of 3.5–4 ml per minute; the concentration of the potassium hydroxide produced was controlled to 16–19% by weight by constant water addition to the catholyte; one foot head on the cathode compartment was maintained.

Operating results after steady state was reached are tabulated in Table III along with Elmendorf tear strength values. Current efficiencies (C.E.) were obtained by relating the amount ratio of potassium hydroxide produced to the number of coulombs used.

TABLE III

| Designation | % KOH | % C.E. | Volts | KWH/MT* | Tear Strength (grams) |
|---|---|---|---|---|---|
| N324 | 18.8 | 82.0 | 4.82 | 2810 | 2620 |
| Composite B | 18.8 | 81.0 | 4.62 | 2726 | 4030 |

*Kilo watt hours/metric ton to caustic potassium hydroxide

Thus, Composite B of this invention offers about 3% improvement in energy consumption over the commercial membrane for this use and more than 50% improvement in tear strength.

EXAMPLE V

Composite E was prepared as described in Example I. These composites were soaked for one-half hour in 0.2% solution of ammonium perfluorooctanoate in water at room temperature. Nafion ® N90209, the standard commercial membrane for finite gap operation in 32% caustic production, was soaked in 2% sodium hydroxide solution in water overnight at room temperature.

Each membrane was placed in an electrochemical cell with an active area of 45 cm² (3" diameter). The anode compartments were made of glass and fitted with flattened DSA anodes obtained from Eltech Systems Corp., of Chardon, Ohio. The cathode compartments were made of polymethylmethacrylate and were fitted with a mild steel expanded steel cathode. In each cell, the anode was placed in contact with the membrane and 3 mm gap was maintained between the membrane and the cathode. In each case, the 1500 EW layer was oriented towards the cathode.

The cells were operated under the following conditions: cell temperature was 85°-90° C.; total current was 14 amperes for a current density of 3.1 kiloamperes per square meter; the concentration of the sodium chloride feed solution was 23.5–24% by weight and it was fed at a rate of 3.1–3.3 ml per minute; the concentration of the sodium hydroxide produced was controlled to 30–35% by weight by constant water addition to the catholyte; one foot head on the cathode compartment was maintained.

Operating results after steady state was reached are tabulated in Table IV along with Elmendorf tear strength values. Current efficiencies (C.E.) were obtained by relating the amount of sodium hydroxide produced to the number of coulombs used.

TABLE IV

| Designation | % NaOH | % C.E. | Volts | KWH/MT* | Tear Strength (grams) |
|---|---|---|---|---|---|
| N90209 | 32 | 95.8 | 3.46 | 2420 | 6080 |
| Composite E | 31.8 | 95.5 | 3.36 | 2358 | 2620 |

*Kilo watt hours/metric ton of sodium hydroxide

Thus, the composites of this invention offer about 2.5% improvement in energy consumption over the commercial membrane for this use and tear strength at an acceptable level.

EXAMPLE VI

Composite A and Composite D, were prepared as described in Example I. In the case of Composite D, a one-inch wide strip of two mil Kapton ® polyimide film (obtained from the DuPont Company) was inserted between the fabric and EPTFE-1 to prevent bonding in that area, thus providing means to run peel strength tests.

Composite H was prepared similarly to that described in Japanese Patent Application Disclosure No. 62-280231 dated Dec. 5, 1987. Sheet structure EPTFE-1 was impregnated with a 3% liquid composition of 920 EW perfluorosulfonic acid polymer in ethyl alcohol and dried at 25° C. Fabric G20×20 was impregnated with a 5% liquid composition of 1100 EW perfluorosulfonic acid polymer in a mixture of water and lower aliphatic alcohols; this solution was obtained from Solution Technology, Mendenhall, Pa. The impregnated fabric was dried at 25° C. The impregnated G20×20 fabric was then sandwiched between two layers of the impregnated EPTFE-1 and heat laminated at 150°-160° C. for 15 minutes. The plies of this intermediate laminate are held together by the perfluoro ion exchange resin impregnant. A one mil continuous membrane of 1500 EW sulfonyl fluoride form of perfluorosulfonic acid polymer was then melt laminated to this intermediate laminate by vacuum lamination at 230° C. The entire structure was then exposed to a 14% potassium hydroxide, 30% dimethyl sulfoxide solution in water at 80° C. for one hour to hydrolyze the continuous membrane to the potassium ion form.

Also similar to that described in Japanese Patent Application Disclosure No. 62-280231, Composite J was prepared like Composite H except that EPTFE-2 was used and impregnated with a 2% liquid composition of 1100 EW perfluorosulfonic acid polymer in a mixture of water and aliphatic alcohols and dried at 25° C. This composite was heat laminated at 210°-220° C. for 15 minutes. The rest of the steps are similar to those for Composite H.

Comparison of peel strength of these composites was made as follows: A two-inch wide strip was cut from each of the composites. The outer layer of the composite located opposite to the continuous ion exchange film was separated from the rest of the composite for about one inch.

The composite part containing the membrane was hung in a suspended clamp which gripped the entire two-inch width. Another clamp with an attached basket was clamped onto the 1" long×2" wide separated portion of the outer layer gripping the entire width. The outer layer was the fabric layer in the cases of Composites A and D. In the case of Composites H and J, representing the type structure disclosed in Japanese Patent Application Disclosure No. 62-280231, the peel values recorded are those for peeling the fabric along with the outer EPTFE layer from the rest of the composite.

Increasing weights were added to the basket hanging from the separated layer until peel initiated and continued to completion. Peel tests were run at room temperature on the composite as prepared, and immediately after soaking for 22 hours in 90°-100° C. water. Results rounded to the nearest 5 grams are tabulated in Table V. Two peel values are recorded for each condition. The lower value indicates either the highest load at which no peel was observed or the lowest load at which peel progressed one inch but then halted. The higher value is the level at which peel propagated through 2.5 inches of strip length.

TABLE V

| Composite Designation | Description | Peel Strength (gms/2" width) As Prepared | After 22 hrs. in 90–100° C. $H_2O$ | Operating Voltage |
|---|---|---|---|---|
| A | 20 × 20/EPTFE-1/1-1500XR EPTFE bonded intermediate | 160–175 | 85–160 | 3.29 |
| D | F8 × 8/EPTFE-1/1-1500XR FEP melt bonded intermediate | 925–1225 | 590–690 | 3.56 |
| H | EPTFE-1/G20 × 20/EPTFE-1/1-1500XR ionomer bonded intermediate | 100–120 | 30–40 | Overvoltage |
| J | EPTFE-2/G20 × 20/EPTFE-2/1-1500XR ionomer bonded intermediate | 40–60 | 40–60 | Overvoltage |

The bonds effected by ionomer impregnant of Composites H and J (the composites of the type described in Japanese Patent Application Disclosure No. 62-280231) are quite weak. Bond strengths drop to nearly zero after hot water exposure. In contrast, the bond of Composite A is stronger and relatively unaffected by extended hot water exposure. The melt bond of Composite D is very strong, both in the as prepared sample and in the specimen that had been exposed 22 hours in 90°-100° C. water. Indeed, with Composite D, peel of the fabric from the membrane takes place by the cleavage of the EPTFE-1 interlayer, not by failure of the fabric-/EPTFE bond.

In addition, the low voltage claims made for the relatively thick, heavily impregnated structures of Japanese Patent Application Disclosure No. 62-280231 as represented by Composites H and J could not be verified under conditions described in Example III. Voltages were so high that the electrolytic cells could not operate. The low voltage levels required for Composites A and D, as determined in Example III, are recorded here again for contrast with the H and J type composites described in Japanese Patent Application Disclosure No. 62-280231.

EXAMPLE VII

Several fabric reinforced composite membrane constructions were evaluated for permeability to water using ASTM E96-80 (inverted cup) to measure their moisture vapor transfer rate (MVTR). Two samples were prepared in a manner similar to that for Composite A or B of Example I and comprised three layers: a thin one mil membrane of 1080 EW perfluorosulfonic acid polymer; a layer of EPTFE-1 or EPTFE-2 sheet; and a fabric of G20×20 fiber fabric reinforcement. The fabric and EPTFE sheet side of the construction was sprayed with a liquid composition of 2% 920 EW perfluorosulfonic acid polymer in 95% ethanol to coat the interior and exterior surfaces of the fine fibril and node structure. As a final treatment, the EPTFE membrane side of the construction was impregnated with a 2.3% solution of ammonium perfluorooctanoate in 15% isopropyl alcohol, 85% water to aid in initial wetting of the structure. These two samples are designated as sample 7A and sample 7B.

Two more samples were prepared which were similar to samples 7A and 7B except that the EPTFE membrane side of each construction was not sprayed with 920 EW liquid composition and was not treated with ammonium perfluorooctanoate solution. These two samples are example composites disclosed in U.S. Pat. No. 4,194,041 and are designated as sample 7C and 7D.

In addition, an unsupported one mil membrane of 1080 EW perfluorosulfonic acid polymer was evaluated.

All perfluorosulfonic acid membranes and composites were tested in the potassium ion form.

Testing was carried out in a controlled environment as prescribed by ASTM E96-80. Samples 7A, 7B, 7C and 7D were placed in the test cups so that the water would contact the EPTFE side of the construction and the perfluorosulfonic acid polymer layer was exposed to the air stream. Test conditions were as follows: room temperature was 22.9° C.; relative humidity was 50%; and the air flow velocity passing across the membrane samples was 550 ft. per minute. In all cases, the test was run for two hours. Results of this testing can be seen in Table VI.

brane and fabric reinforcement are attached as disclosed in U.S. Pat. No. 4,194,041.

EXAMPLE VIII

Two samples of membrane were evaluated for permeability to water using a modification of the desiccant method described in ASTM E96-80. The first sample (designated 8A) was prepared by first laminating G20×20 EPTFE fiber fabric to EPTFE-1 membrane as described in Example I. This intermediate laminate was restrained and coated on the EPTFE membrane side with a 1.3% liquid composition of 1100 EW perfluorosulfonic acid polymer in 60% water, 40% 1-methoxy-2-propanol. The solvent makeup of this liquid composition was intended to provide a uniform layer of liquid which adhered to, but did not substantially penetrate, the EPTFE membrane. The liquid composition was allowed to dry at 23° C. Two more coats of liquid composition were applied by this procedure. The resultant coating was 0.2 mil thick as determined by optical methods.

The fabric/EPTFE side of the laminate was then treated with a 0.5% liquid composition of 920 EW perfluorosulfonic acid polymer in a solution comprising 84% water; 14% ethanol; and 2.0% ammonium perfluorooctanoate, and was allowed to dry at 23° C. This liquid composition was designed to fully wet the fabric/EPTFE side of the laminate without disturbing the continuous 1100 EW membrane on the opposite side.

The second sample (designated 8B) was Nafion® 417, a commercially available, fabric-reinforced, 7 mil thick perfluorosulfonic acid polymer membrane obtained from DuPont.

Both samples were tested in the acid form of the perfluorosulfonic acid polymer.

The water permeation test requires that 8"×8" specimens be placed in a supporting ring and floated (fabric

TABLE VI

| Designation | Description | MVTR (g/m²/24 hrs.) |
|---|---|---|
| Sample 7A | G20 × 20/EPTFE-1/1-1080XR/920EW/APFO | 9465 |
| Sample 7B | G20 × 20/EPTFE-2/1-1080XR/920EW/APFO | 10913 |
| Sample 7C | G20 × 20/EPTFE-1/1-1080XR | 7236 |
| Sample 7D | G20 × 20/EPTFE-2/1-1080XR | 5671 |
| 1 mil 1080 | 1 mil 1080EW perfluorosulfonic acid polymer | 8631 |

The data in Table VI show that samples 7A and 7B which were sprayed with a 2% liquid composition of 920 EW perfluorosulfonic acid polymer, as in Example I, to render the EPTFE hydrophilic had significantly higher MVTR values than samples 7C and 7D, similar constructions which had not been sprayed with 920 EW perfluorosulfonic acid polymer liquid composition.

Samples 7A and 7B had MVTR values comparable to or higher than the one mil 1080 EW unsupported membrane while the 7C and 7D samples had MVTR values significantly lower than the one mil 1080 EW unsupported membrane. This demonstrates that the moisture vapor transfer properties of the one mil 1080 EW membrane are not diminished when the EPTFE membrane and fabric reinforcement are attached in accordance with the present invention. However, the moisture vapor transfer properties of the one mil 1080 EW membrane are significantly diminished when EPTFE memside down) in a controlled temperature, distilled water bath at 23° C.±0.2° C. A 70 ml aliquot of a slurry of potassium acetate in distilled water (5 to 1 ratio) was added to each of several desiccant cups (4.5 oz. capacity, 6.5 cm i.d. opening). An EPTFE membrane was sealed over each desiccant cup opening to contain the desiccant. This membrane was part number #S10831 and was obtained from W. L. Gore & Associates, Inc. Desiccant cups were weighed to an accuracy of ±0.001 g and were immediately placed onto their respective samples. The desiccant cups were allowed to absorb moisture through the samples for exactly 10 minutes. After the 10 minutes had elapsed, the cups were removed from the samples and reweighed. Moisture vapor transmission rate was calculated directly from the desiccant cup weight gain, surface area of sample and elapsed time of the test. Results of this testing can be seen in Table VII.

TABLE VII

| Designation | Description | MVTR (g/m²/24 hrs.) |
|---|---|---|
| Sample 8A | G20 × 20/EPTFE-1,0.2 mil, Cast 1100EW Membrane, 920EW/APFO | 132,054 |

TABLE VII-continued

| Designation | Description | MVTR (g/m²/24 hrs.) |
|---|---|---|
| Sample 8B | Nafion ® 417, 7 mil, 1100EW Nafion ®/24 × 24 Teflon Fiber Fabric Reinforced Membrane | 17,450 |

The data in Table VII show that sample 8A had greater than 7 times higher moisture vapor transmission rate than sample 8B, the commercially available perfluorosulfonic acid membrane. This difference is attributed to the fact that commercial membranes with embedded reinforcing fabrics require 5 to 10 mils of thickness to remain continuous while the composite in accordance with this invention allows for the fabrication of a very thin, continuous perfluorosulfonic acid polymer layer in the composite.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A multilayer composite membrane comprising a synthetic fabric bonded at points of contact to one side of a layer of porous, expanded polytetrafluoroethylene (EPTFE), said EPTFE layer having a continuous perfluoro ion exchange polymer film laminated thereto on the side opposite said one side, said fabric and porous EPTFE having a coating on at least a portion of the internal and external surfaces thereof of a perfluoro ion exchange resin.

2. A multilayer composite membrane comprising a continuous perfluoro ion exchange polymer film having a synthetic fabric layer bonded at points of contact to both sides of said perfluoro ion exchange polymer film in sandwich-like configuration by means of an porous EPTFE interlayer interposed between said ion exchange polymer film and each said synthetic fabric layer, said fabric and porous EPTFE having a coating on at least a portion of the internal and external surfaces thereof of a perfluoro ion exchange resin.

3. The composite of claim 1 wherein said fabric is made from halogen containing synthetic fibers.

4. The composite of claim 1 wherein said fabric is made from synthetic fibers selected from the class consisting of polytetrafluoroethylene, a perfluoro copolymer of tetrafluoroethylene or polytetrafluoroethylene fibers coated with perfluoro copolymers of tetrafluoroethylene.

5. The composite of claim 2 wherein said fabric is made from synthetic fibers selected from the class consisting of polytetrafluoroethylene, a perfluoro copolymer of tetrafluoroethylene or polytetrafluoroethylene fibers coated with perfluoro copolymers of tetrafluoroethylene.

6. The composite of claim 1 or 2 wherein said fabric is woven fabric.

7. The composite of claim 1 or 2 wherein said fabric is nonwoven fabric.

8. The composite of claim 1 or 2 wherein the external surface of the fibers of said fabric is non-ionomeric.

9. The composite of claims 1, 2, 3 or 4 wherein said continuous perfluoro ion exchange polymer film is perfluorosulfonate.

10. The composite of claims 1, 2, 3 or 4 wherein said continuous perfluoro ion exchange polymer film is perfluorocarboxylate.

11. The composite of claim 1 wherein said perfluoro ion exchange polymer film is a bilayer comprising a layer of perfluorosulfonate bonded to a layer of perfluorocarboxylate, wherein said perfluorosulfonate is adjacent said EPTFE layer.

12. The composite of claim 1 or 2 wherein the interior and exterior surfaces of the EPTFE and said fabric are coated with perfluorosulfonic acid polymer of equivalent weight less than 1000.

13. The composite of claim 1 or 2 wherein the interior and exterior surfaces of the EPTFE and said fabric are coated with perfluorocarboxylic acid polymer of equivalent weight less than 1000.

14. The composite of claim 1 or 2 wherein said fabric and EPTFE are impregnated with an ionic surfactant.

15. The composite of claim 1 or 2 wherein said fabric and EPTFE are impregnated with an ionic perfluorosurfactant.

16. The composite of claim 1 or 2 wherein said EPTFE layer is 0.2 to 5 mils thick.

17. The composite of claim 1 wherein said fabric and porous EPTFE have a coating on substantially all internal and external surfaces thereof of a perfluoro ion exchange resin.

18. The composite of claim 2 wherein said fabric and porous EPTFE have a coating on substantially all internal and external surfaces thereof of a perfluoro ion exchange resin.

19. The composite of claim 1 or 2 wherein the peel strength of said bond between said fabric and EPTFE layer exceeds 30 grams per inch of width.

20. The composite of claim 1 or 2 wherein the peel strength of said bond between said fabric and EPTFE layer exceeds 30 grams per inch of width after immersion of said composite in water maintained at 90°–100° C. for over 22 hours.

21. The composite of claim 1 or 2 used as a reinforced thin selective barrier in chemical separations.

22. The composite of claim 1 or 2 used as an electrolytic separator between anode and cathode compartments in an electrolyzer.

23. The composite of claim 1 or 2 used as a thin continuous barrier in permeation separation operations.

24. The composite of claim 1 or 2 used as a thin continuous barrier in facilitated transport operations.

25. The composite of claim 1 or 2 wherein the interior and exterior surfaces of the EPTFE and said fabric are coated with a salt form of a perfluorosulfonate polymer of equivalent weight less than 1000.

26. The composite of claim 1 or 2 wherein the interior and exterior surfaces of the EPTFE and said fabric are coated with a salt form of a perfluorocarboxylate polymer of equivalent weight less than 1000.

27. The composite of claim 2 wherein said fabric is made from halogen containing synthetic fibers.

* * * * *